Aug. 24, 1954  J. E. SCHEB  2,687,060
MUSICAL NOTE AND KEYBOARD TRANSLATOR
Filed March 19, 1952  2 Sheets-Sheet 1

INVENTOR
JOSEPH E. SCHEB

BY *Gustave Miller*
ATTORNEY

Aug. 24, 1954      J. E. SCHEB      2,687,060

MUSICAL NOTE AND KEYBOARD TRANSLATOR

Filed March 19, 1952      2 Sheets-Sheet 2

INVENTOR
JOSEPH E. SCHEB

BY Gustave Miller

ATTORNEY

Patented Aug. 24, 1954

2,687,060

UNITED STATES PATENT OFFICE 2,687,060

MUSICAL NOTE AND KEYBOARD TRANSLATOR

Joseph E. Scheb, Sarasota, Fla.

Application March 19, 1952, Serial No. 277,449

4 Claims. (Cl. 84—482)

1

This invention relates to a musical note and keyboard translator and has for an object to provide a musical note and keyboard translator for enabling musical beginners to more readily translate the relationship between musical notes and musical staff as normally reckoned to the corresponding key on the keyboard of a piano, accordion, organ, or similar instrument, and in addition, to learn the letter name that goes with both the musical note and the corresponding key on the musical keyboard.

A further object of this invention is to provide a musical note and keyboard translator that assists the beginner in memorizing the relationship between the printed musical notes, the note as it appears on the keyboard of the instrument, and in addition, the letter name that is usually applied to such note.

Still a further object of this invention is to provide a musical note and keyboard translator wherein musical notes and musical staff are printed in the normal size that popular music is usually written, and providing a slide similar to a slide rule so that the relationship between each note as printed and the keyboard representation as well as the letter name may be easily ascertained and thereby may be memorized.

Still a further object of this invention is to provide a musical note and keyboard translator that assists the musical beginner in learning the location of the note on the keyboard, and then thereafter, if desired, to also learn the letter name that applies to such note.

Still a further object of this invention is to provide a musical note and keyboard translator made up in the broad aspect of a slide rule and utilizing the front face of the envelope and of the slide for indicating the relationship between the musical staff and musical notes to that of the position of the keyboard and then using the reverse face of the device for indicating the corresponding letter name that applies to the indicated musical note representation and keyboard.

Still a further object of this invention is to provide a musical note and keyboard translator that may be printed and made and sold very inexpensively, thus keeping its cost well within the reach of the average musical beginner.

With the foregoing and other objects in view, this invention comprises the combination, construction and arrangement of parts hereinafter set forth, claimed and disclosed in the accompanying drawings, wherein:

Fig. 1 is a plan view of the musical note and keyboard translator of this invention, showing the front face, partly broken away.

2

Figure 1:
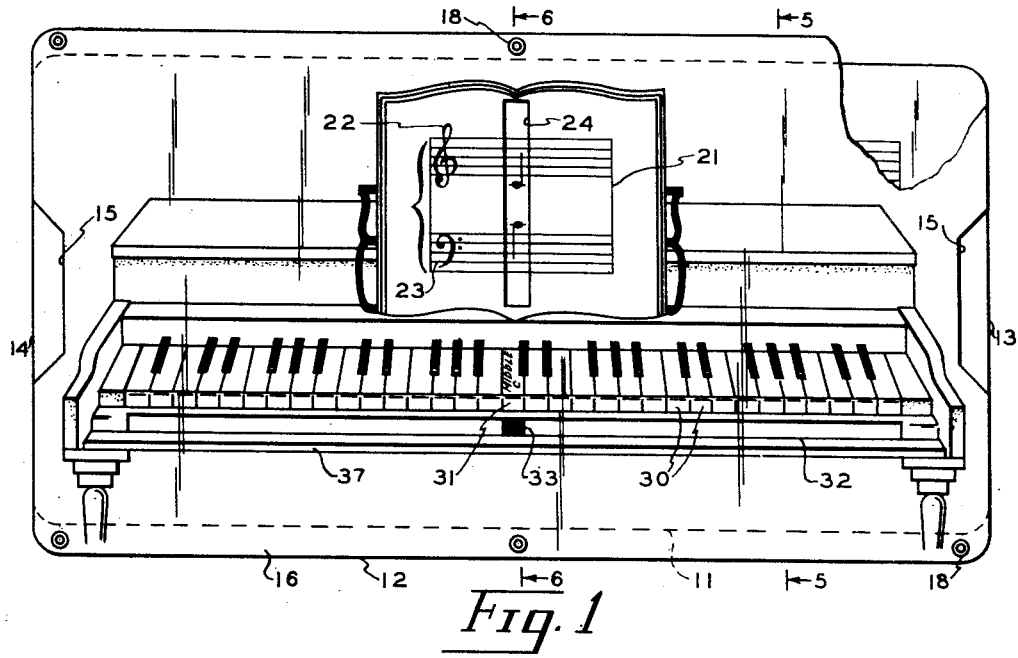
Figure 2:
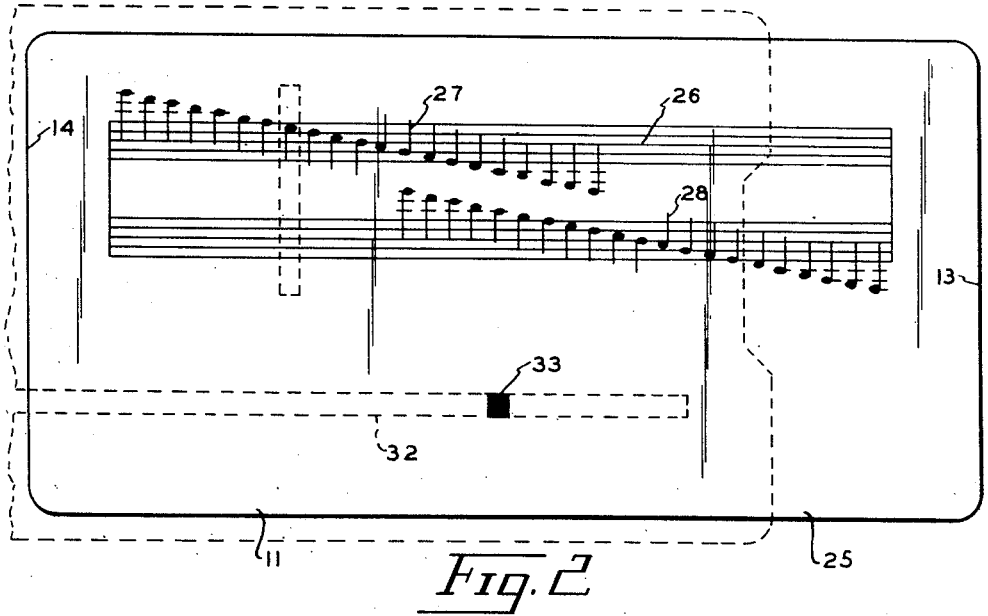
Fig. 2 is a plan view of the corresponding front face of the slide sheet.

There is shown at 10 the musical note and keyboard translator of this invention generally in the form of a slide rule and including a slide sheet 11 arranged to slide within a longitudinally extending open ended envelope 12, the length of the slide sheet 11 being in such relation to the envelope 12 that at least one short end 13 or 14 of the slide sheet 11 will always extend through one of the short open ends of the envelope 12, each short open end of the envelope 12 being finger notched at 15, whereby the overall length of the slide sheet 11 and of the envelope 12 may thus be substantially equal.

As shown, the envelope 12 includes a front face 16 and a rear face 17 suitably secured together along the longitudinal edges as by eyelet rivets 18 and by spacer strips 20 of substantially the same thickness as the thickness of the slide sheet 11 so that the slide sheet 11 may slide back and forth easily therethrough as desired.

At the center of the front face 16 of the envelope 10 there is provided a representation of a musical staff 21 which may include both a treble clef staff 22 and a bass clef staff 23. The staff 21 is printed in the normal size that music is usually printed, corresponding to the usual size for printing popular music. Extending vertically across the grand staff 21 is a window 24 through which the front face 25 of the slide sheet 11 will be visible. Printed on this front face 25 is a group of lines and spaces 26 over which are printed substantially all of the musical note representations 27 on the treble clef portion thereof, and an identical group of lines and spaces on which are printed substantially all of musical note representations 28 on the bass clef portion thereof.

Also printed on the face of the front face 16 of the envelope 11 is the representation of a keyboard, which may be a piano, accordion, and organ, or a similar instrument. In this case, a piano keyboard 37 has been used as the example, and the piano keyboard 37 includes the keyboard representations 39 corresponding to most of the white keys on a piano keyboard. The middle C note of the keyboard 31 which may be marked as shown, is located preferably in vertical alignment with the vertically extending window 24 thereabove. The black keys of the keyboard are likewise printed in their usual position, so as to identify the various white keys by their relative position thereto. The envelope front face 16 is also provided with a longitudinally extending window 32 located just below longitudinally extending keyboard musical representations 30 and 31, and visible through this window 32 is a marker indicium 33 suitably printed on the front face 25 of the slide sheet 11.

This indicium marker 33 is located on the slide sheet front face 25 in vertical alignment with the musical note representations corresponding to middle C, and the width of the keyboard representations 30 and 31 corresponds substantially identically with that of the spacings of the musical note representations 27 and 28, also, musical note representations extend in the opposite direction of the musical keyboard representations.

When the slide sheet 11 is located in the mid position within the envelope 12 the indicium marker 33 will be located adjacent the keyboard representation 31 of middle C, and likewise musical representations on both the treble clef and the bass clef of middle C will be correspondingly visible through the vertically extending window 24. Using the slide sheet 11 one keyboard representation to the left, for instance, will bring the marker 33 adjacent the keyboard representation for B next to middle C, and likewise will make the musical note representation of this same note B visible through the vertically extending window 24 due to the fact that such musical note representations extend in the opposite direction of the keyboard representations as above pointed out. Hence, by moving slide sheet 11 back and forth, and stopping it at different position, whatever key is pointed out by the indicium marker 33 visible through the window 32 will always correspond to the musical note representation visible through the window 24.

The musical beginner may, by using this device, recognize and memorize the musical notes corresponding to the particular keys on the instrument.

A further feature is that in addition to learning the correspondence between the musical note and the key, the beginner may also learn the ready names thereof. This is accomplished by using the reverse face 34 of the slide sheet 11 and the reverse face 17 of the envelope 12. The sheet 11 is pivoted around its longitudinal axis, and then the letter names 35 of the keys and of the musical notes are printed in a longitudinally extending series across the rear face 34 of slide sheet 11, likewise reading in a reverse direction for the same reason that the musical representations 27 and 28 read in a reverse direction. A window 36 is provided in the envelope rear face 17 and so located thereon, that when the marker indicium 33 of the front side is located adjacent middle C keyboard representation 31, the musical note representations corresponding thereto are simultaneously visible through the vertically extending window 24, the letter name C would be visible through the window 36.

Figure 3:
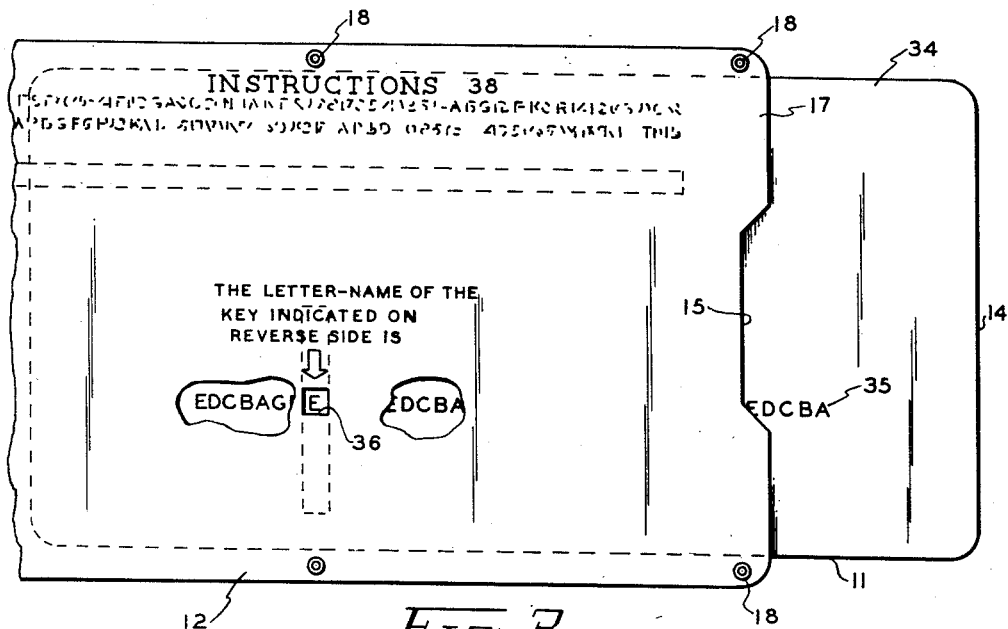
Fig. 3 is a partly fragmentary plan view of the rear face of the musical note and keyboard translator.
Figure 4:
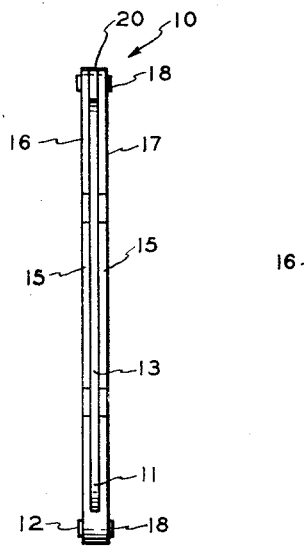
Fig. 4 is an edge view of a short side of the translator.
Figure 5:
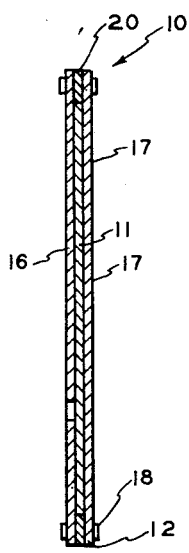
Fig. 5 is a sectional view on line 5—5 of Fig. 1.
Figure 6:
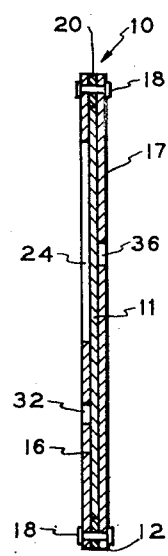
Fig. 6 is a sectional view on line 6—6 of Fig. 1.

As shown in Fig. 3, the slide sheet 11 has been pulled out to one side and shows the letter name E therethrough. Rotating the translator 10 about its longitudinal axis without moving the slide 11 relative to the envelope 12 would show that the marker indicium 33 through the slot 32 would be adjacent the corresponding keyboard key, the note E would likewise appear through the vertically extending window 24 in the grand staff 21.

Thus, the musical beginner may use this translator to study and memorize the correspondence between keyboard keys and the musical notes, and having learned this correspondence, may also carry the idea further and learn the letter names of all the keys by merely pivoting the translator 10 about its longitudinal axis to identify each key and note according to its letter-name.

In addition to the representations of the keyboard and grand staff, the front face 16 may also include a representation of the instrument such as a piano 37 to which the particular keyboard belongs. Likewise the rear face 17 of the envelope 12 may include instructions and directions for use at 38 appropriate to subject matter of the translator.

While the device has been shown and the structure described in detail, it is obvious that this invention is not to be considered as being limited to the exact form disclosed, and that changes in detail and construction may be made therein within the scope of what is claimed, without departing from the spirit of this invention.

Having thus set forth and disclosed the nature of this invention, what is claimed is:

1. A musical note and keyboard translator comprising a longitudinally extending guide envelope having its opposite short ends open, a vertically extending window in approximately the center of the envelope front face spaced substantially above its bottom edge, a longitudinally extending front face window below said vertical window, musical staff indicia of substantially the normal size extending at opposite sides of said vertical window, musical keyboard representations located along said longitudinally extending window, a slide sheet of a size to reciprocably slide through the open ends of said envelope and always have at least one end available through one end of said envelope, musical staff and musical note representations extending longitudinally across said slide sheet, said musical staff being located to be visible through said envelope front vertically extending window and align with the musical staff at opposite sides thereof, a marker indicium on said slide sheet visible through said front envelope longitudinally extending window, the horizontal spacing of said musical note representations on said slide sheet and of the musical keyboard representations being substantially identical with said representations extending in opposite directions, said marker indicium being located in vertical alignment with that musical note representation on said slide sheet corresponding to the particular keyboard representation which is in vertical alignment with said vertical window, whereby when said slide sheet is stopped with any musical representation visible through said vertical window, said marker indicium will always indicate the particular key on the musical keyboard that corresponds thereto, a series of letter names extending longitudinally on the back face of said slide sheet, each name being spaced correspondingly to said musical keyboard and note representations, and a marker window in the envelope rear face showing the letter name therethrough that corresponds with the corresponding musical note and keyboard representation pointed out through the front windows, whereby said translator may be rotated to make the letter name observable that corresponds to the indicated musical note and keyboard representations.

2. A musical note and keyboard translator comprising a longitudinally extending guide envelope having its opposite short ends open, a vertically extending window in approximately the center of the envelope front face spaced substantially above its bottom edge, a longitudinally extending front face window below said vertical window, musical staff indicia extending adjacent at least one side of said vertical window, musical keyboard representations located along said longitudinally extending window, a slide sheet of a size to reciprocably slide through the open ends of said envelope and always have at least one end available through one end of said envelope, musical staff and musical note representations extending longitudinally across said slide sheet, said musical staff being located to be visible through said envelope front vertically extending window and align with the musical staff thereat, a marker indicium on said slide sheet visible through said front envelope longitudinally extending window, the horizontal spacing of said musical note representations on said slide sheet and of the musical keyboard representations being substantially identical with said musical note representations extending in the opposite direction of said keyboard representations, said marker indicium being located in vertical alignment with that musical note representation on said slide sheet corresponding to the particular keyboard representation which is in vertical alignment with said vertical window, whereby when said slide sheet is stopped with any musical representation visible through said vertical window, said marker indicium will always indicate the particular key on the musical keyboard that corresponds thereto, a series of letter names extending longitudinally on the back face of said slide sheet, each name being spaced correspondingly to said musical keyboard and note representations, said series extending in reverse direction, and a marker window in the envelope rear face showing the letter name therethrough that corresponds with the corresponding musical note and keyboard representation pointed out through the front windows, said letter name series being upside down to said musical note representations, whereby said translator may be rotated about its longitudinal axis to make the letter name observable that corresponds to the indicated musical note and keyboard representations.

3. A musical note and keyboard translator comprising a longitudinally extending guide envelope having its opposite short ends open, means along the longitudinal sides securing the envelope front and rear sides in slightly spaced apart position, a vertically extending window in approximately the center of the envelope front face spaced substantially above its bottom edge, a longitudinally extending front face window below said vertical window, musical staff indicia of substantially the normal size extending at opposite sides of said vertical window, musical keyboard representations located along said longitudinally extending window, a slide sheet of a size to reciprocably slide through the open ends of said envelope and always have at least one end available through one end finger notch, musical staff and musical note representations extending longitudinally across said slide sheet, said musical staff being located to be visible through said envelope front vertically extending window and align with the musical staff at opposite sides thereof, a marker indicium on said slide sheet visible through said front envelope longitudinally extending window, the horizontal spacing of said musical note representations on said slide sheet and of the musical keyboard representations being substantially identical with said musical note representations extending in the opposite direction of said keyboard representations, said marker indicium being located in vertical alignment with that musical note representation on said slide sheet corresponding to the particular keyboard representation which is in vertical alignment with said vertical window, whereby when said slide sheet is stopped with any musical representation visible through said vertical window, said marker indicium will always indicate the particular key on the musical keyboard that corresponds thereto, a series of letter names extending longitudinally on the back face of said slide sheet, each name being spaced correspondingly to said musical keyboard and note representations, said series extending in reverse direction, and a marker window in the envelope rear face showing the letter name therethrough that corresponds with the corresponding musical note and keyboard representation pointed out through the front windows, said letter name series being upside down to said musical note representation, whereby said translator may be rotated about its longitudinal axis to make the letter name observable that corresponds to the indicated musical note and keyboard representations.

4. A musical note and keyboard translator comprising a longitudinally extending guide envelope having its opposite short ends open, a vertically extending window in approximatey the center of the envelope front face spaced substantially above its bottom edge, a longitudinally extending front face window below said vertical window, musical staff indicia extending adjacent at least one side of said vertical window, musical keyboard representations located along said longitudinally extending window, a slide sheet of a size to reciprocably slide through the open ends of said envelope and always have at least one end available through one end of said envelope, musical staff and musical note representations extending longitudinally across said slide sheet, said musical staff being located to be visible through said envelope front vertically extending window and align with the musical staff thereat, a marker indicium on said slide sheet visible through said front envelope longitudinally extending window, the horizontal spacing of said musical note representations on said slide sheet and of the musical keyboard representations being substantially identical with said musical note representations extending in the opposite direction of said keyboard representations, said marker indicium being located in vertical alignment with that musical note representation on said slide sheet corresponding to the particular keyboard representation which is in vertical alignment with said vertical window, whereby when said slide sheet is stopped with any musical representation visible through said vertical window, said marker indicium will always indicate the particular key on the musical keyboard that corresponds thereto, a series of letter names extending longitudinally on the back face of said slide sheet, each name being spaced correspondingly to said musial keyboard and note representations, and a marker window in the envelope rear face showing the letter name therethrough that corresponds with the corresponding musical note and keyboard representation pointed out through the front windows, whereby said translator may be rotated to make the letter name observable that corresponds to the indicated musical note and keyboard representations.

References Cited in the file of this patent

UNITED STATES PATENTS

| Number | Name | Date |
|---|---|---|
| 605,157 | Wickersham | June 7, 1898 |
| 762,990 | Dunning | June 21, 1904 |
| 1,732,377 | Patterson | Oct. 22, 1929 |
| 1,741,769 | Hall | Dec. 31, 1929 |
| 1,785,440 | Ekstedt | Dec. 16, 1930 |
| 2,332,842 | Champion | Oct. 26, 1943 |

FOREIGN PATENTS

| Number | Country | Date |
|---|---|---|
| 539,044 | Germany | Nov. 23, 1931 |